United States Patent
Wu et al.

(10) Patent No.: US 12,428,101 B2
(45) Date of Patent: Sep. 30, 2025

(54) ELECTRIC POWER-ASSIST BICYCLE AND ELECTRIC ENERGY MANAGEMENT METHOD FOR ELECTRIC POWER-ASSIST BICYCLE

(71) Applicant: APh ePower Co., Ltd., Kaohsiung (TW)

(72) Inventors: Chien-Hsun Wu, Kaohsiung (TW);
Hsiu-Hsien Su, Kaohsiung (TW);
Shang-Zeng Huang, Kaohsiung (TW)

(73) Assignee: Aph ePower Co., Ltd., Kaohsiung (TW)

( * ) Notice: Subject to any disclaimer, the term of this patent is extended or adjusted under 35 U.S.C. 154(b) by 35 days.

(21) Appl. No.: 18/670,746

(22) Filed: May 22, 2024

(65) Prior Publication Data
US 2025/0121910 A1   Apr. 17, 2025

(30) Foreign Application Priority Data

Oct. 11, 2023   (TW) .................................. 112138727

(51) Int. Cl.
*B62M 6/50*   (2010.01)

(52) U.S. Cl.
CPC .................................... *B62M 6/50* (2013.01)

(58) Field of Classification Search
CPC ... B62M 6/50; B62M 6/90; B62M 6/45; B62J 43/13; B60L 15/20; B60L 50/60;
(Continued)

(56) References Cited

U.S. PATENT DOCUMENTS

| | | | |
|---|---|---|---|
| 6,196,347 B1 * | 3/2001 | Chao | G01L 3/1435 180/220 |
| 12,168,496 B2 * | 12/2024 | Tsukamoto | B62M 6/50 |

(Continued)

FOREIGN PATENT DOCUMENTS

TW   I701182   8/2020

OTHER PUBLICATIONS

Kuen-Bao Sheu, "Simulation for the analysis of a hybrid electric scooter powertrain", Applied Energy, Nov. 13, 2007, pp. 589-606, vol. 85.

(Continued)

*Primary Examiner* — Richard M Camby
(74) *Attorney, Agent, or Firm* — JCIPRNET

(57) ABSTRACT

An electric power-assist bicycle and an electric energy management method for the electric power-assist bicycle are provided. The electric power-assist bicycle includes a crank, a motor, a battery module, and a computing circuit. The crank is applied with a pedaling force to provide a plurality of pedaling powers to the electric power-assist bicycle. The battery module provides a plurality of battery powers to the motor. The computing circuit obtains a plurality of total demand powers and a plurality of total demand current values of the electric power-assist bicycle and obtains a plurality of distribution ratios between the battery powers and the pedaling powers. The computing circuit establishes a target function according to the total demand powers, the total demand current values, and the distribution ratios. The computing circuit obtains a target total input power according to a current pedaling power and the target function.

14 Claims, 7 Drawing Sheets

(58) Field of Classification Search
CPC .......... B60L 2200/12; B60L 2240/421; B60L 2240/423; B60L 2240/547; B60L 2240/549
See application file for complete search history.

(56) References Cited

U.S. PATENT DOCUMENTS

| | | | |
|---|---|---|---|
| 2013/0110335 A1 | 5/2013 | Durdevic et al. | |
| 2022/0194517 A1* | 6/2022 | Nelson | B62M 25/04 |
| 2023/0079320 A1* | 3/2023 | Tsukamoto | B62M 6/55 |
| | | | 180/206.3 |
| 2023/0303206 A1* | 9/2023 | Baumgaertner | B60L 15/20 |
| 2025/0108882 A1* | 4/2025 | Jordan | B62M 6/50 |
| 2025/0108883 A1* | 4/2025 | Jordan | B62M 11/02 |

OTHER PUBLICATIONS

Sheng-Chung Tzeng et al., "Optimization of the dual energy-integration mechanism in a parallel-type hybrid vehicle", Applied Energy, Jul. 28, 2004, pp. 225-245, vol. 80.

O. Erdinc et al., "A wavelet-fuzzy logic based energy management strategy for a fuel cell/battery/ultra-capacitor hybrid vehicular power system", Journal of Power Sources, May 3, 2009, pp. 369-380, vol. 194.

Tomaž Katrašnik, "Analytical method to evaluate fuel consumption of hybrid electric vehicles at balanced energy content of the electric storage devices", Applied Energy, Jul. 6, 2010, pp. 3330-3339, vol. 87.

Jeremy Neubauer et al., "Sensitivity of battery electric vehicle economics to drive patterns, vehicle range, and charge strategies", Journal of Power Sources, Mar. 6, 2012, pp. 269-277, vol. 209.

Jürgen Garche et al., "Battery Management Systems (BMS) for Increasing Battery Life Time", TELESCON 2000. Third International Telecommunications Energy Special Conference (IEEE Cat. No. 00EX424), May 10, 2000, pp. 81-84.

* cited by examiner

ELECTRIC POWER-ASSIST BICYCLE AND ELECTRIC ENERGY MANAGEMENT METHOD FOR ELECTRIC POWER-ASSIST BICYCLE

CROSS-REFERENCE TO RELATED APPLICATION

This application claims the priority benefit of Taiwan application serial no. 112138727, filed on Oct. 11, 2023. The entirety of the above-mentioned patent application is hereby incorporated by reference herein and made a part of specification.

BACKGROUND

Technical Field

The disclosure relates to an electric vehicle and an electric energy management method for the electric vehicle, and in particular, to an electric power-assist bicycle and an electric energy management method for the electric power-assist bicycle.

Description of Related Art

An electric power-assist bicycle can move using the rider's pedaling force and the electric power provided by the motor. However, currently-available electric power-assist bicycles do not properly distribute the pedaling force and the electric power-assist force. Therefore, when the rider's pedaling force changes, the balance of distribution between the pedaling force and the electric power-assist force disappears. The moving state of the electric power-assist bicycle will be affected. In addition, the energy saving effect will also be affected. Therefore, how to provide an effective power management mechanism based on the rider's pedaling force is one of the research focuses for a person having ordinary skill in the art.

SUMMARY

The disclosure provides an electric power-assist bicycle and an electric energy management method for the electric power-assist bicycle capable of providing an effective electric energy management mechanism based on a rider's pedaling force.

The disclosure provides an electric power-assist bicycle including a crank, a motor, a battery module, and a computing circuit. The crank is applied with a pedaling force to provide a plurality of pedaling powers to the electric power-assist bicycle. The battery module is coupled to the motor. The battery module provides battery powers to the motor, so that the motor provides an electric power-assist force. The computing circuit is coupled to the battery module. The computing circuit obtains a plurality of total demand powers of the electric power-assist bicycle. A first total demand power among the total demand powers is equal to a sum of a first pedaling power among the pedaling powers and a first battery power among the battery powers. The computing circuit obtains a plurality of total demand current values of the electric power-assist bicycle and obtains a plurality of distribution ratios between the battery powers and the pedaling powers. The computing circuit establishes a target function according to the total demand powers, the total demand current values, and the distribution ratios. The computing circuit detects the crank to obtain a current pedaling power and obtains a target total input power according to the current pedaling power and the target function. The battery module provides one of the battery powers according to the target total input power.

The disclosure further provides an electric energy management method for an electric power-assist bicycle. The electric power-assist bicycle includes a crank, a motor, a battery module. The crank is applied with a pedaling force to provide a plurality of pedaling powers to the electric power-assist bicycle. The battery module provides a plurality of battery powers to the motor. The electric energy management method includes the following steps. A plurality of total demand powers of the electric power-assist bicycle are obtained. Herein, a first total demand power among the total demand powers is equal to a sum of a first pedaling power among the pedaling powers and a first battery power among the battery powers. A plurality of total demand current values of the electric power-assist bicycle are obtained. A plurality of distribution ratios between the battery powers and the pedaling powers are obtained. A target function is established according to the total demand powers, the total demand current values, and the distribution ratios. The crank is detected to obtain a current pedaling power, and a target total input power is obtained according to the current pedaling power and the target function. The battery module provides one of the battery powers to the motor according to the target total input power, so that the motor provides an electric power-assist force.

To sum up, the electric power-assist bicycle establishes the target function and obtains the target total input power according to the current pedaling power and the target function. The battery module provides one of the battery powers to the motor according to the target total input power. In this way, the electric power-assist bicycle exhibits an electric energy management function based on the current pedaling power.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
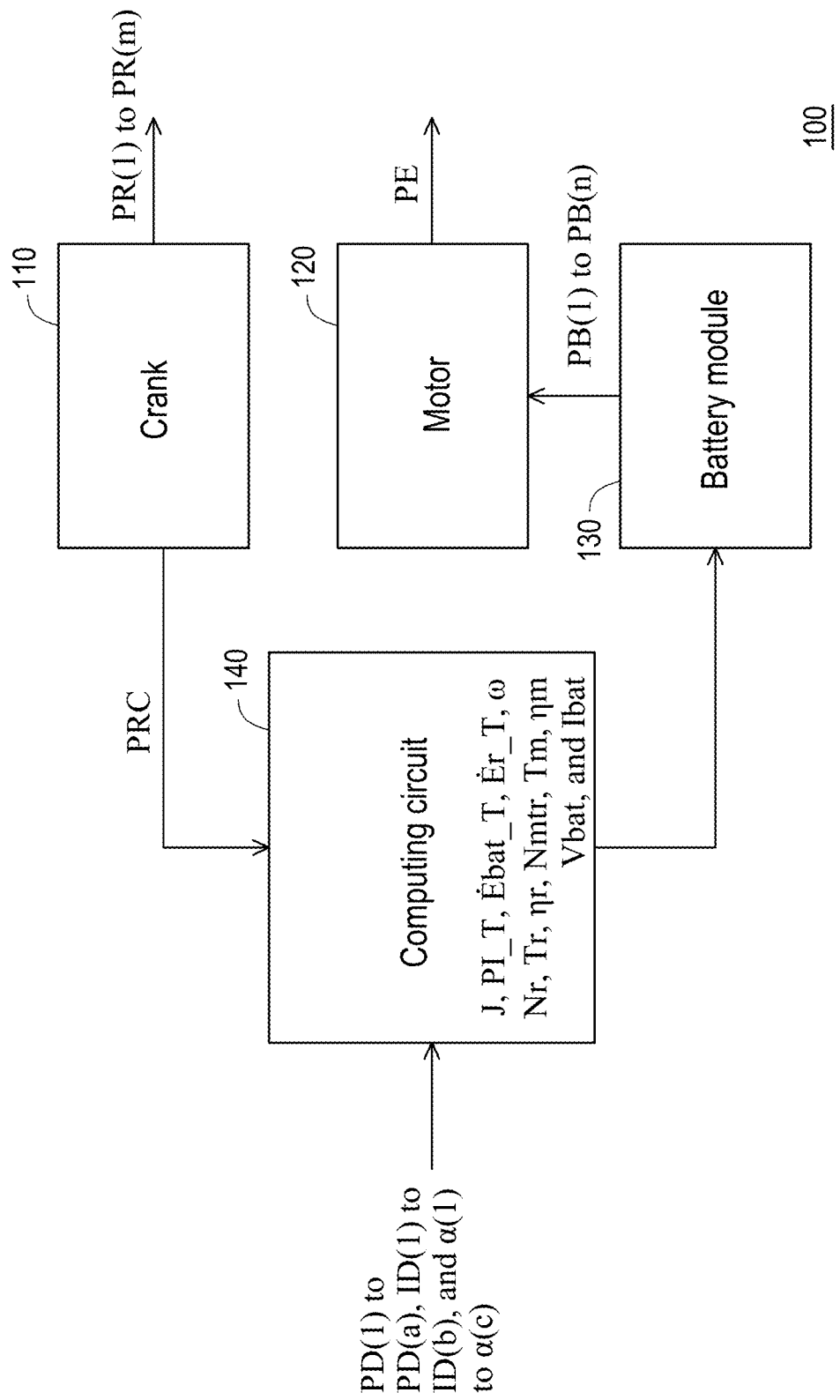
FIG. 1 is a schematic diagram illustrating an electric power-assist bicycle according to an embodiment of the disclosure.

Several embodiments of the disclosure are described in detail below accompanying with figures. In terms of the reference numerals used in the following descriptions, the same reference numerals in different figures should be considered as the same or the like elements. The embodiments are only a portion of the disclosure, which do not present all embodiments of the disclosure. More specifically, these embodiments are only examples in the scope of the patent application of the disclosure.

With reference to FIG. 1, FIG. 1 is a schematic diagram illustrating an electric power-assist bicycle according to an embodiment of the disclosure. In this embodiment, an electric power-assist bicycle 100 includes a crank 110, a motor 120, a battery module 130, and a computing circuit 140. The crank 110 is applied with a pedaling force FR to provide a plurality of pedaling powers to the electric power-assist bicycle 100. The battery module 130 is coupled to the motor 120. The battery module 130 provides battery powers to the motor 120, so that the motor 120 provides an electric power-assist force PE. In this embodiment, based on different pedaling forces FR, a rider can provide different pedaling powers PR(1) to PR(m) to the electric power-assist bicycle 100. The battery module 130 can provide different battery powers PB(1) to PB(n) to the motor 120. Therefore, the motor 120 provides different electric power-assist forces PE corresponding to the battery powers PB(1) to PB(n).

In this embodiment, the computing circuit 140 is coupled to the battery module 130. The computing circuit 140 obtains total demand powers PD(1) to PD(a) of the electric power-assist bicycle 100. Each of the total demand powers PD(1) to PD(a) is a sum of one of the pedaling powers PR(1) to PR(m) and one of the battery powers PB(1) to PB(n). For instance, the total demand power PD(1) is equal to the sum of the pedaling power PR(1) and the battery power PB(1). For instance, the total demand power PD(2) is equal to the sum of the pedaling power PR(1) and the battery power PB(2).

In this embodiment, the computing circuit 140 obtains total demand current values ID(1) to ID(b) of the electric power-assist bicycle 100. The computing circuit 140 obtains distribution ratios α(1) to α(c) between the battery powers PB(1) to PB(n) and the pedaling powers PR(1) to PR(m). For instance, the distribution ratio α(1) may relate to a power distribution relationship between the battery power PB(1) and the pedaling power PR(1). The total demand current value ID(1) to ID(b) are related to a battery output current Ibat of the battery module 130.

In this embodiment, the computing circuit 140 establishes a target function J according to the total demand powers PD(1) to PD(a), the total demand current values ID(1) to ID(b), and the distribution ratios α(1) to α(c). The computing circuit 140 detects the crank 110 to obtain a current pedaling power PRC and obtains a target total input power PI_T according to the current pedaling power PRC and the target function J. The battery module 130 provides the corresponding battery power according to the target total input power PI_T.

In this embodiment, "a", "b", "c", "m", and "n" are integers greater than 1.

For instance, the target function J may include a multi-dimensional table of the total demand powers PD(1) to PD(a), the total demand current values ID(1) to ID(b), and the distribution ratios α(1) to α(c). The total demand powers PD(1) to PD(a), the total demand current values ID(1) to ID(b), and the distribution ratios α(1) to α(c) correspond to different dimensions of the target function J. The total demand powers PD(1) to PD(a) are a plurality of grid points in the first dimension. The total demand current values ID(1) to ID(b) are a plurality of grid points in the second dimension. The distribution ratios α(1) to α(c) are a plurality of grid points in the third dimension. A plurality of result grid points in the target function J are a plurality of total input powers. The computing circuit 140 may find at least one candidate total input power from the target function J according to the current pedaling power PRC and a fixed total demand power and select a minimum input power from the at least one candidate total input power as the target total input power PI_T. For instance, the computing circuit 140 may use a global grid search (GGS) to find and select the minimum input power and treat the minimum input power as the target total input power PI_T.

In this embodiment, the current pedaling power PRC may be one of the pedaling powers PR(1) to PR(m).

It is worth mentioning herein that the electric power-assist bicycle 100 establishes the target function J and obtains the target total input power PI_T according to the current pedaling power PRC and the target function J. The computing circuit 140 provides one of the battery powers to the motor 120 according to the target total input power PI_T. In this way, the electric power-assist bicycle 100 exhibits an electric energy management function based on the current pedaling power PRC.

For instance, once the target total input power PI_T is determined, the computing circuit 140 at least obtains the distribution ratio corresponding to the target total input power PI_T when a current total demand power remains unchanged. The computing circuit 140 can also calculate a target battery input power Èbat_T corresponding to the target total input power PI_T according to the distribution ratio. Therefore, the battery module 130 operates according to the target battery input power Èbat_T.

Figure 2:
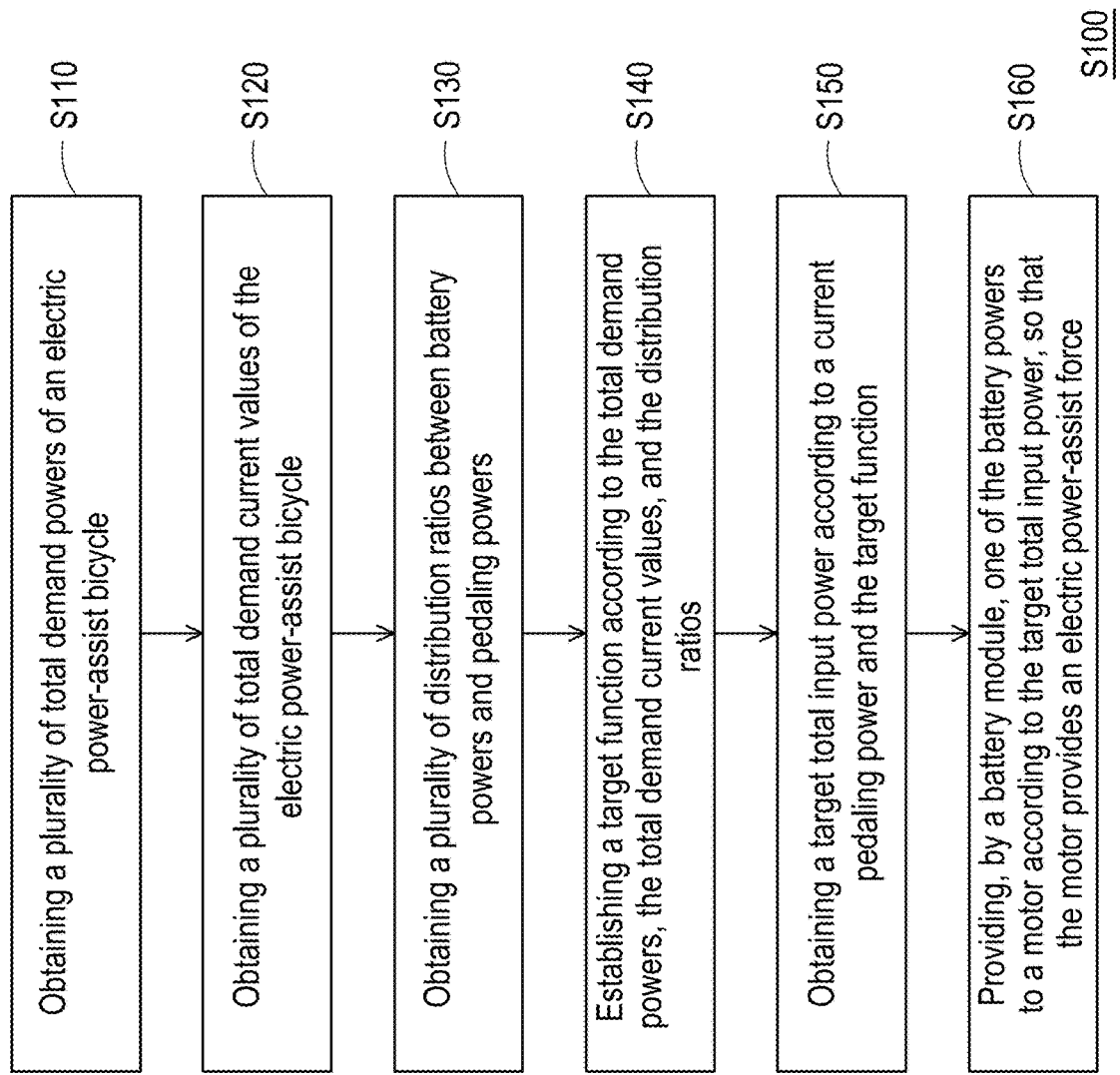
FIG. 2 is a flow chart illustrating an electric energy management method according to an embodiment of the disclosure.

With reference to FIG. 1 and FIG. 2 together, FIG. 2 is a flow chart illustrating an electric energy management method according to an embodiment of the disclosure. An electric energy management method S100 is applicable to the electric power-assist bicycle 100. In this embodiment, the electric energy management method S100 includes steps S110 to S160. The computing circuit 140 obtains the total demand powers PD(1) to PD(a) of the electric power-assist bicycle 100 in step S110. The computing circuit 140 obtains the total demand current values ID(1) to ID(b) of the electric power-assist bicycle 100 in step S120. The computing circuit 140 obtains the distribution ratios α(1) to α(c) in step S130. In step S140, the computing circuit 140 establishes the target function J according to the total demand powers PD(1) to PD(a), the total demand current values ID(1) to ID(b), and the distribution ratios α(1) to α(c).

The computing circuit 140 detects the crank 110 to obtain the current pedaling power PRC and obtains the target total input power PI_T according to the current pedaling power PRC and the target function J in step S150. In step S160, the battery module 130 provides one of the battery powers to the motor 120 according to the target total input power PI_T, so that the motor 120 provides the electric power-assist force PE.

For further illustration, please refer to the embodiment of FIG. 1. In this embodiment, relationships among a battery power PB, a pedaling power PR, and a total demand power PD may be determined by Formulas (1) to (4). The computing circuit 140 divides the battery power PB by the total demand power PD to calculate a distribution ratio α. It should be understood that in formulas (1) to (4), the battery power PB may be one of the battery powers PB(1) to PB(n). The pedaling power PR may be one of the pedaling powers PR(1) to PR(m). The total demand power PD may be one of the total demand powers PD(1) to PD(a). The distribution ratio α may be one of the distribution ratios α(1) to α(c).

$$PB = \alpha \times PD \quad \text{Formula (1)}$$

$$PR = (1-\alpha) \times PD \quad \text{Formula (2)}$$

$$PB + PR = \alpha \times PD + (1-\alpha) \times PD \quad \text{Formula (3)}$$

$$PD = PB + PR \quad \text{Formula (4)}$$

In this embodiment, a minimum value of the target function J is shown in Formula (5). Ėbat is a battery input power. Ėr is a pedaling input power. ω is a penalty value. The minimum value of the target function J is equal to a minimum value of a sum of the battery input power, the pedaling input power, and the penalty value. In other words, the minimum value is equal to the target total input power PI_T.

$$J = \min(\dot{E}bat + \dot{E}r + \omega) \quad \text{Formula (5)}$$

In this embodiment, the computing circuit 140 determines whether the total input powers of the target function J exceed a predetermined value. When a total input power of the target function J exceeds the penalty value, the computing circuit 140 adds the penalty value ω to the total input power that is greater than the predetermined value. The penalty value ω is "10⁶", for example. Therefore, the total input power added with the penalty value ω is ignored. For instance, the predetermined value may be a maximum battery power of the electric power-assist bicycle 100 when it first starts. Therefore, the computing circuit 140 adds the penalty value ω to the total input power that is greater than the maximum battery power when the electric power-assist bicycle 100 just starts. Therefore, the target function J to which the penalty value ω is added is not the minimum value.

In addition, the computing circuit 140 does not add the penalty value ω to the total input power that is less than or equal to the predetermined value. Therefore, the target total input power PI_T is equal to a sum of a target pedaling input power Ėr_T and the target battery input power Ėbat_T corresponding to the target total input power PI_T.

In this embodiment, the computing circuit 140 calculates the target pedaling input power Ėr_T according to a rotation speed Nr of the crank 110, a torque Tr of the crank 110, and a pedaling efficiency ηr. The computing circuit 140 calculates the target battery input power Ėbat_T according to a rotation speed Nmtr of the motor 120, a torque Tm of the motor 120, and a motor efficiency ηm.

For instance, the battery input power is shown in Formula (6). The pedaling input power is shown in Formula (7). Pm is power consumption of the motor. Pr is power consumption of the rider.

$$\dot{E}bat = \frac{Pm}{\eta m} = \frac{Tm \times Nm}{\eta m} = Vbat \times Ibat \quad \text{Formula (6)}$$

$$\dot{E}r = \frac{Pr}{\eta r} = \frac{Tr \times Nr}{\eta r} \quad \text{Formula (7)}$$

The computing circuit 140 multiplies the rotation speed Nmtr of the motor 120 by the torque Tm of the motor 120 and divides it by the motor efficiency ηm to calculate the target battery input power Ėbat_T. In addition, the target battery input power Ėbat_T is equal to a product of a battery output voltage Vbat of the battery module 130 and a battery output current Ibat of the battery module 130.

The computing circuit 140 multiplies the torque Tr of the crank 110 by the rotation speed Nr of the crank 110 and divides it by the pedaling efficiency ηr to calculate the target pedaling input power Ėr_T.

Figure 3:
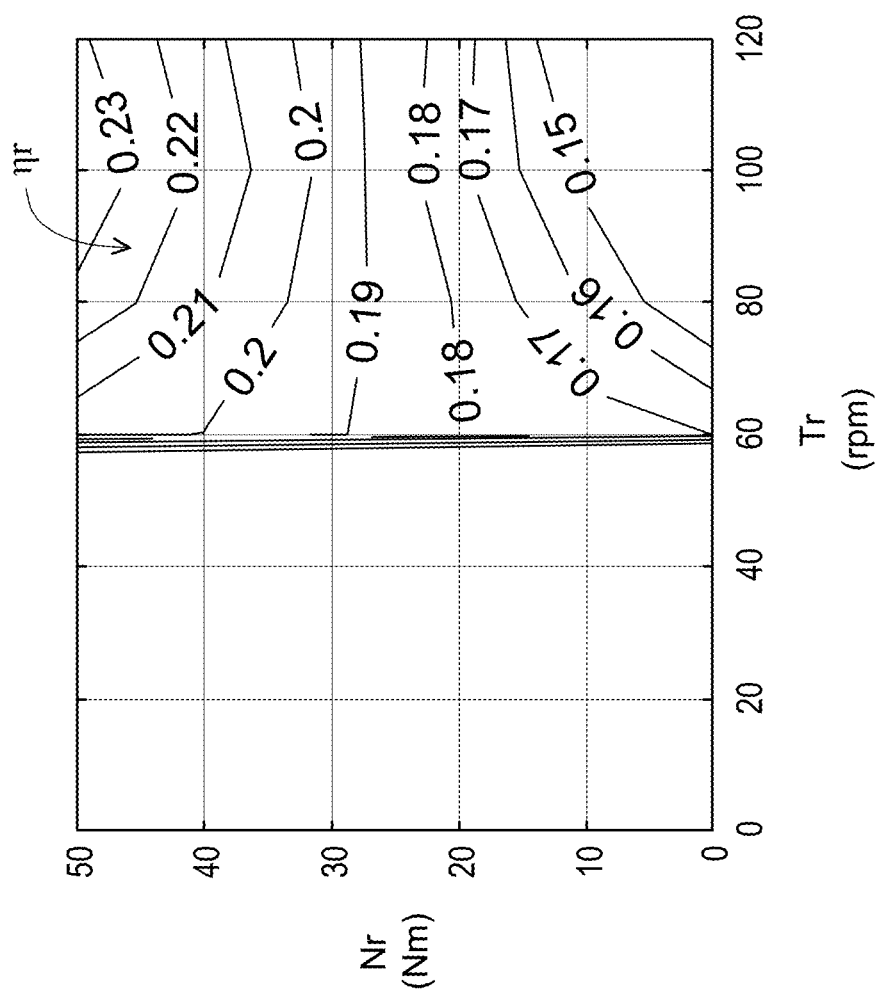
FIG. 3 is a schematic plot illustrating pedaling efficiency according to an embodiment of the disclosure.
Figure 4:
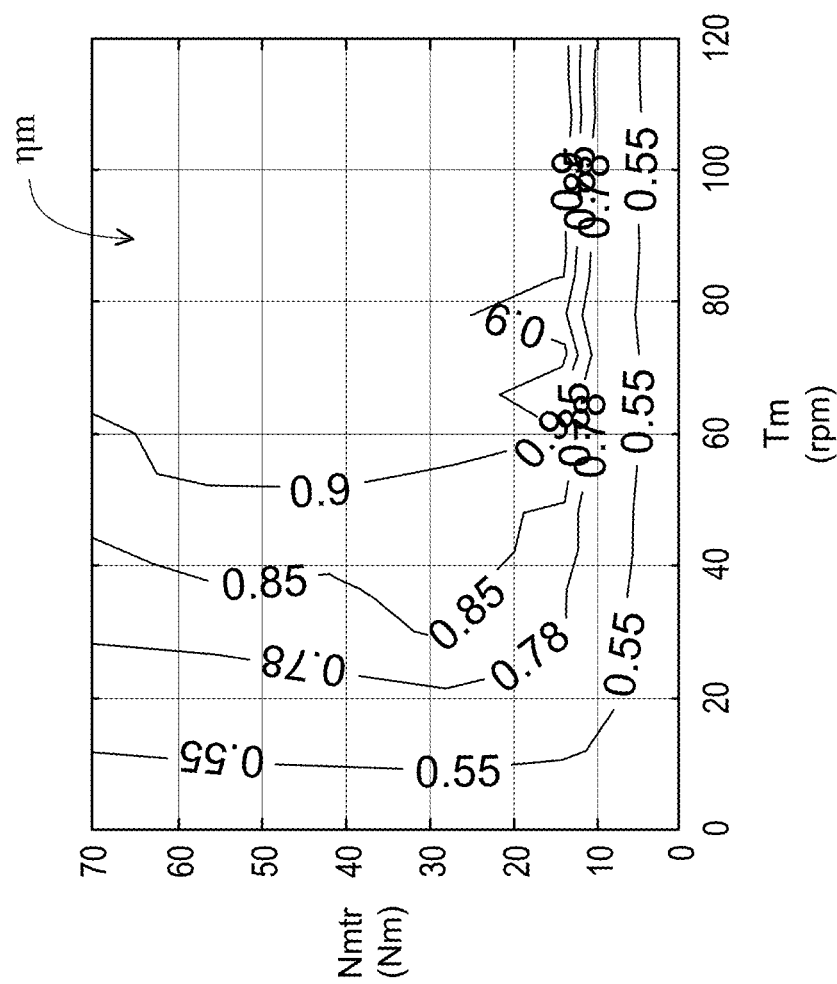
FIG. 4 is a schematic plot illustrating motor efficiency according to an embodiment of the disclosure.

With reference to FIG. 1, FIG. 3, and FIG. 4 together, FIG. 3 is a schematic plot illustrating pedaling efficiency according to an embodiment of the disclosure. FIG. 4 is a schematic plot illustrating motor efficiency according to an embodiment of the disclosure. In this embodiment, FIG. 3 shows a contour plot of the pedaling efficiency ηr. FIG. 3 shows relationships among the pedaling efficiency ηr, the rotation speed Nr (unit: rpm) of the crank 110, and the torque Tr (unit: Nm) of the crank 110. FIG. 4 shows a contour plot of the motor efficiency ηm. FIG. 4 shows a relationship between the motor efficiency ηm and the rotation speed Nmtr (unit: rpm) of the motor 120 multiplied by the torque Tm (unit: Nm) of the motor 120. The computing circuit 140 may obtain the pedaling efficiency ηr and the motor efficiency ηm based on FIG. 3 and FIG. 4.

With reference to the embodiment of FIG. 1 again, in this embodiment, substituting Formula (6) and Formula (7) into Formula (5) is performed, and Formula (5) is modified into Formula (8).

$$J = \min\left(Vbat \times Ibat + \frac{Tr \times Nr}{\eta r} + \omega\right) \quad \text{Formula (8)}$$

Therefore, when the target total input power PI_T (i.e., the minimum value of the target function J) and the total demand power (i.e., one of the total demand powers PD(1) to PD(a)) remain unchanged, when the rotation speed Nr and/or the torque Tr of the crank 110 changes, the computing circuit 140 correspondingly modifies at least one of the battery output voltage Vbat and the battery output current Ibat. In this way, the rider can obtain a stable riding experience. In addition, the target total input power PI_T is equal to the minimum value of the target function J. Therefore, the electric power-assist bicycle 100 also exhibits the advantage of energy saving.

Figure 5:
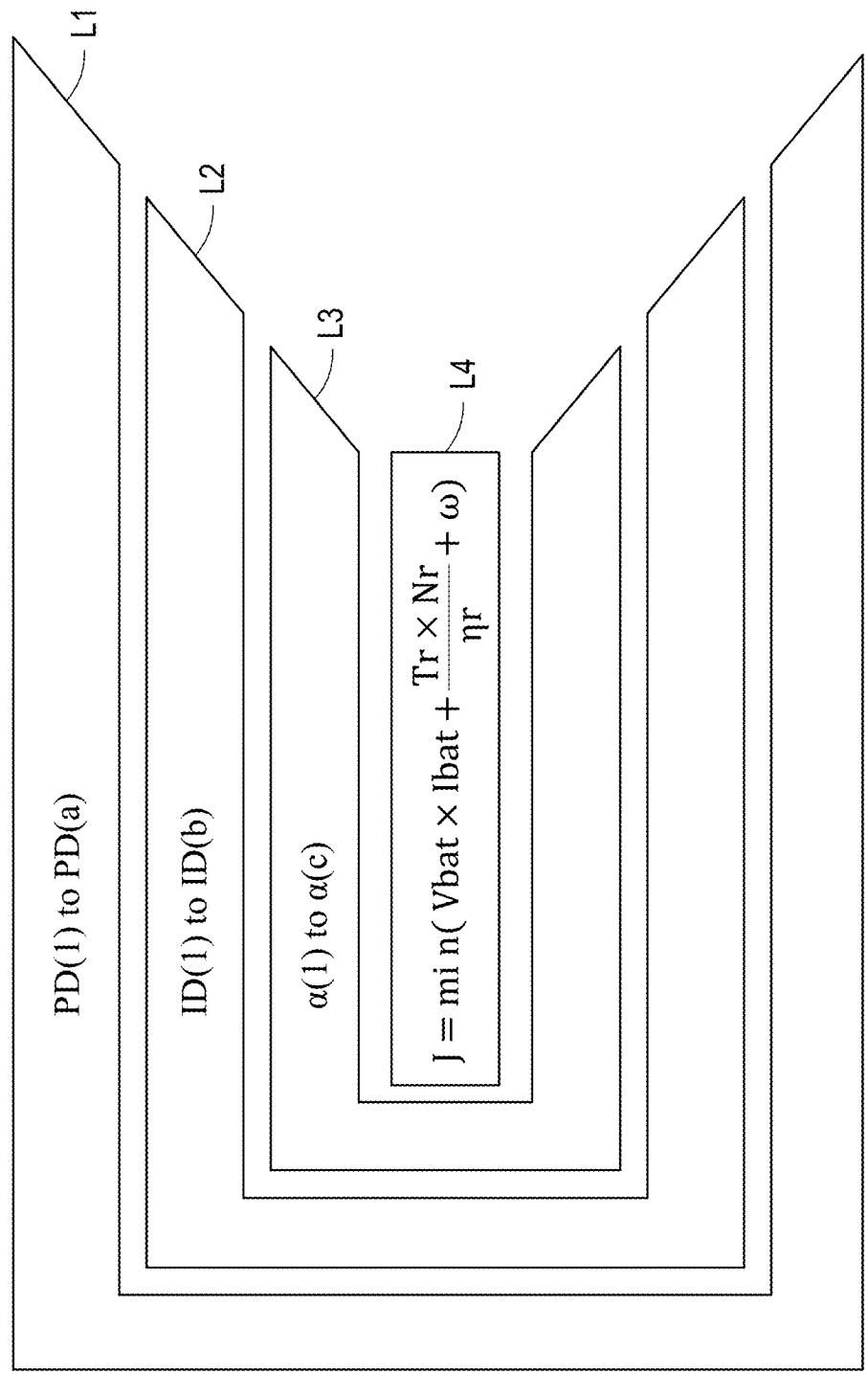
FIG. 5 is a schematic diagram illustrating establishment loops according to an embodiment of the disclosure.
Figure 6:
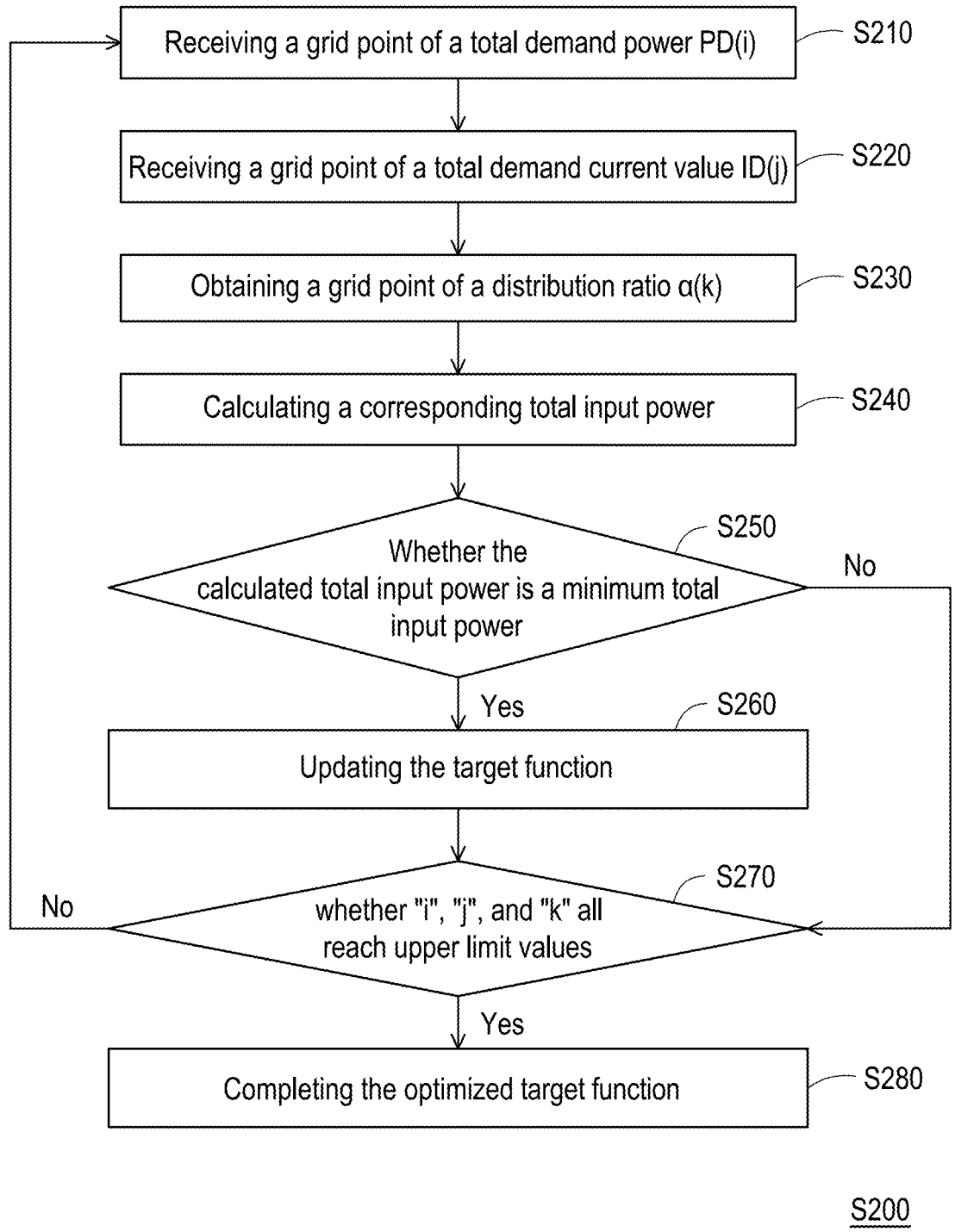
FIG. 6 is flow chart illustrating optimization of a target function according to an embodiment of the disclosure.

With reference to FIG. 1, FIG. 5, and FIG. 6 together, FIG. 5 is a schematic diagram illustrating establishment loops according to an embodiment of the disclosure. FIG. 6 is flow chart illustrating optimization of a target function according to an embodiment of the disclosure. In this embodiment, FIG. 5 shows establishment loops L1 to L4 of the target function J. An optimization process S200 of the target function J includes steps S210 to S280. Step S210 is used to execute the establishment loop L1. Step S220 is used to execute the establishment loop L2. Step S230 is used to execute the establishment loop L3. Steps S240 to S280 are used to execute the establishment loop L4.

In step S210, the computing circuit 140 receives a grid point of a total demand power PD(i) of the electric power-assist bicycle 100. In step S220, the computing circuit 140 receives a grid point of a total demand current value ID(j) of the electric power-assist bicycle 100. In step S230, the computing circuit 140 obtains a grid point of a distribution ratio α(k). In step S240, the computing circuit 140 calculates a corresponding total input power according to the total demand power PD(i), the total demand current value ID(j), and the distribution ratio α(k).

In step S250, the computing circuit 140 determines whether the currently calculated total input power is a minimum total input power. The computing circuit 140 calculates the total input power based on Formulas (5) to (8), for example. When the currently calculated total input power is the minimum total input power, the computing circuit 140 updates the target function J using the minimum total input power in step S260. Next, the computing circuit 140 determines whether "i", "j", and "k" reach upper limit values in step S270.

In step S250, when the currently calculated total input power is not the minimum total input power, the computing circuit 140 does not update the target function J and determines whether "i", "j", and "k" all reach the upper limit values in step S270.

In step S270, when "i" reaches an upper limit value "a", "j" reaches an upper limit value "b", and "k" reaches an upper limit value "c", this means that the computing circuit 140 obtains all the total input powers. Therefore, the optimized target function J is completed in step S280. On the other hand, when at least one of "i", "j", and "k" has not reached the upper limit value, the establishment process S200 returns to the operation of step S210. The computing circuit 140 increments "i", "j", and/or "k" to obtain the next total input power until it is determined whether "i", "j", and "k" all reach the upper limit value.

Figure 7:
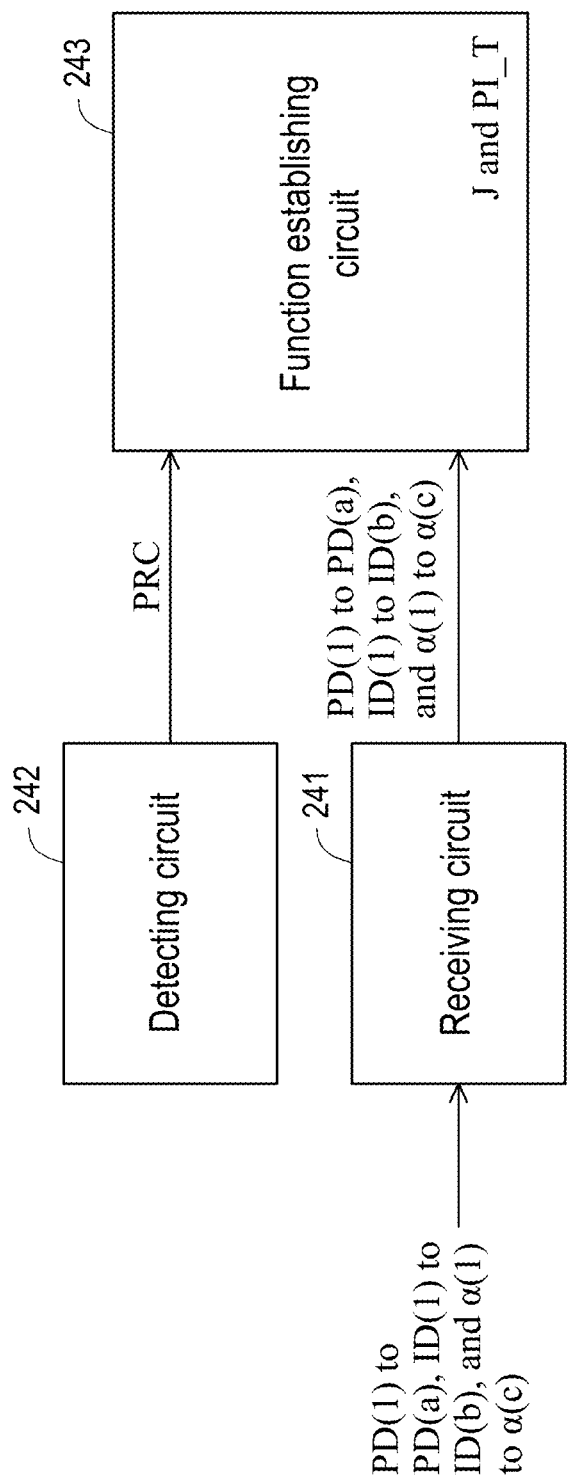
FIG. 7 is a schematic diagram illustrating a computing circuit according to an embodiment of the disclosure.

With reference to FIG. 1, FIG. 5, and FIG. 7 together, FIG. 7 is a schematic diagram illustrating a computing circuit according to an embodiment of the disclosure. In this embodiment, a computing circuit 240 includes a receiving circuit 241, a detecting circuit 242, and a function establishing circuit 243. The receiving circuit 241 sequentially receives the total demand powers PD(1) to PD(a), the total demand current value ID(1) to ID(b), and the distribution ratio α(1) to α(c) in the establishment loops L1, L2, and L3. The detecting circuit 242 detects the crank 110 to obtain the current pedaling power PRC. The function establishing circuit 243 is coupled to the receiving circuit 241 and the detecting circuit 242. The function establishing circuit 243 calculates a plurality of total input powers based on the total demand powers PD(1) to PD(a), the total demand current values ID(1) to ID(b), and the distribution ratios α(1) to α(c) in the establishment loop L4 to establish the target function J. The function establishing circuit 243 calculates the plurality of total input powers based on Formula (1) to Formula (7), for example. The target function J may be stored in a memory circuit. In addition, the computing circuit 240 finds the target total input power PI_T from the plurality of total input powers in the target function J according to at least the current pedaling power PRC.

In view of the foregoing, the computing circuit of the electric power-assist bicycle establishes the target function and obtains the target total input power according to the current pedaling power and the target function. In this way, the electric power-assist bicycle exhibits an electric energy management function based on the current pedaling power. In addition, the target total input power is the minimum total input power. Therefore, the electric power-assist bicycle also exhibits the advantage of energy saving.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electric power-assist bicycle, comprising:
   a crank applied with a pedaling force to provide a plurality of pedaling powers to the electric power-assist bicycle;
   a motor;
   a battery module coupled to the motor and configured to provide a plurality of battery powers to the motor, so that the motor provides an electric power-assist force; and
   a computing circuit coupled to the battery module and configured to:
   obtain a plurality of total demand powers of the electric power-assist bicycle, wherein a first total demand power among the total demand powers is equal to a sum of a first pedaling power among the pedaling powers and a first battery power among the battery powers,
   obtain a plurality of total demand current values of the electric power-assist bicycle,
   obtain a plurality of distribution ratios between the battery powers and the pedaling powers,
   establish a target function according to the total demand powers, the total demand current values, and the distribution ratios, and
   detect the crank to obtain a current pedaling power and obtain a target total input power according to the current pedaling power and the target function,
   wherein the battery module provides one of the battery powers according to the target total input power.

2. The electric power-assist bicycle according to claim 1, wherein the computing circuit divides the first battery power by the first total demand power to calculate a first distribution ratio among the distribution ratios.

3. The electric power-assist bicycle according to claim 1, wherein the target total input power is equal to a sum of a target pedaling input power and a target battery input power.

4. The electric power-assist bicycle according to claim 3, wherein the computing circuit calculates the target pedaling input power according to a rotation speed of the crank, a torque of the crank, and a pedaling efficiency.

5. The electric power-assist bicycle according to claim 3, wherein the computing circuit calculates the target battery input power according to a rotation speed of the motor, a torque of the motor, and a motor efficiency of the motor.

6. The electric power-assist bicycle according to claim 3, wherein the target battery input power is equal to a product of a battery output voltage of the battery module and a battery output current of the battery module.

7. The electric power-assist bicycle according to claim 1, wherein
   the computing circuit determines whether a plurality of total input powers of the target function exceed a predetermined value, and
   when a first total input power among the total input powers exceeds the predetermined value, the computing circuit adds a penalty value to the first total input power, so that the first total input power is ignored.

8. An electric energy management method for an electric power-assist bicycle comprising a crank, a motor, and a battery module, wherein the crank is applied with a pedaling force to provide a plurality of pedaling powers to the electric power-assist bicycle, wherein the battery module provides a plurality of battery powers to the motor, wherein the electric energy management method comprises:

obtaining a plurality of total demand powers of the electric power-assist bicycle, wherein a first total demand power among the total demand powers is equal to a sum of a first pedaling power among the pedaling powers and a first battery power among the battery powers;

obtaining a plurality of total demand current values of the electric power-assist bicycle;

obtaining a plurality of distribution ratios between the battery powers and the pedaling powers;

establishing a target function according to the total demand powers, the total demand current values, and the distribution ratios, wherein the target function comprises a plurality of total input powers;

detecting the crank to obtain a current pedaling power and selecting a target total input power among the total input powers according to the current pedaling power and the target function; and providing, by the battery module, one of the battery powers to the motor according to the target total input power, so that the motor provides an electric power-assist force.

9. The electric energy management method according to claim 8, wherein the step of obtaining the distribution ratios between the battery powers and the pedaling powers comprises:

dividing the first battery power by the first total demand power to calculate a first distribution ratio among the distribution ratios.

10. The electric energy management method according to claim 8, wherein the target total input power is equal to a sum of a target pedaling input power and a target battery input power.

11. The electric energy management method according to claim 10, further comprising calculating the target pedaling input power according to a rotation speed of the crank, a torque of the crank, and a pedaling efficiency.

12. The electric energy management method according to claim 10, further comprising calculating the target battery input power according to a rotation speed of the motor, a torque of the motor, and a motor efficiency of the motor.

13. The electric energy management method according to claim 10, wherein the target battery input power is equal to a product of a battery output voltage of the battery module and a battery output current of the battery module.

14. The electric energy management method according to claim 8, further comprising determining whether a plurality of total input powers of the target function exceed a predetermined value; and when a first total input power among the total input powers exceeds the predetermined value, adding a penalty value to the first total input power, so that the first total input power is ignored.

* * * * *